No. 80,350.
PATENTED JULY 28, 1868.
J. HOFFMAN.
TANNER'S HOOK.
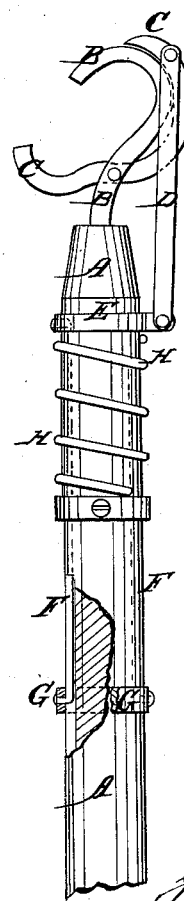
Witnesses
Wm A Morgan
G. C. Cotton
Inventor
Jas. Hoffman
per Munn & Co
Atty's

United States Patent Office.

JAMES HOFFMAN, OF BELVIDERE, NEW JERSEY.

Letters Patent No. 80,850, dated July 28, 1868.

IMPROVED TANNERS' HOOK.

The Schedule referred to in these Letters Patent and making part of the same.

TO ALL WHOM IT MAY CONCERN:

Be it known that I, JAMES HOFFMAN, of Belvidere, in the county of Warren, and State of New Jersey, have invented a new and improved Tanners' Hook; and I do hereby declare that the following is a full, clear, and exact description thereof, which will enable those skilled in the art to make and use the same, reference being had to the accompanying drawing, forming part of this specification, in which—

The figure is a side view of my improved tanners' hook, part being broken away to show the construction.

My invention has for its object to furnish an improved hook for tanners' use, in handling hides in the vat, which shall be so constructed and arranged as to handle the hides without injuring their grain.

And it consists in the construction and combination of the various parts of the hook, as hereinafter more fully described.

A is the handle of the hook, which is made of the usual length and size.

To the lower end of the handle A is attached a hook, B, which may be made in about the shape and size of an ordinary tanners hook, except that the end or point of the hook is cut off square, as shown in the figure.

C is a lever, which is pivoted to the shank of the hook B.

The forward end of this lever is made square, and is so bent or curved that, when closed, it may exactly meet the end of the hook B, so as to grasp the hide between them.

The rear end of the lever C is so formed, that when the forward end of said lever is moved away from the hook B, the said rear end may lie along the rear side of the said hook B. as shown, so as to be out of the way, and so as not to interfere with the movement of the hook in the vat.

To the rear end of the lever C is pivoted the lower end of the connecting-rod D, the upper end of which is pivoted to the ring E, which passes around, and slides up and down upon the lower part or end of the handle A.

To the opposite sides of the ring E are attached the lower ends of two rods F, which are placed and work in longitudinal grooves in the opposite sides of the handle A, and the upper ends of which are attached to a ring, G, sliding upon the handle A.

By moving the ring G up upon the handle A, the forward end of the lever C will be drawn forward against the point of the hook B, so as to grasp and hold the hide.

On or more other rings, G, may be attached to the rods F, in different positions upon the handle A, according to the place in which the hand will naturally be in handling hides at different depths in the vat.

H is a wire spring, coiled around the lower part of the handle A, the lower end of which rests against the ring E, and the upper end of which rests against the ring I, stationarily attached to the handle A for this purpose, so that the pressure of said spring may force the forward end of the lever C away from the hook B, when the ring G is released from the hand.

I claim as new, and desire to secure by Letters Patent—

1. Pivoting a lever-hook, C, to the shank of a tanners' hook B, substantially as herein shown and described, and for the purpose set forth.

2. The combination of the lever-hook C, connecting-rod D, sliding ring E, sliding rods F, one or more sliding rings G, and the coiled spring H, with each other and with the hook B and handle A, substantially as herein shown and described, and for the purpose set forth.

JAMES HOFFMAN.

Witnesses:
WILLIAM HOLLANDER,
HENRY KILLIAN.